(12) United States Patent
Aylward et al.

(10) Patent No.: US 8,629,402 B2
(45) Date of Patent: Jan. 14, 2014

(54) X-RAY IMAGING PANEL WITH THERMALLY-SENSITIVE ADHESIVE AND METHODS OF MAKING THEREOF

(75) Inventors: Brian P. Aylward, Concord, NC (US); Seshadri Jagannathan, Rochester, NY (US); Kevin L. Bishop, Rochester, NY (US); Richard A. Lombardo, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 222 days.

(21) Appl. No.: 13/300,925

(22) Filed: Nov. 21, 2011

(65) Prior Publication Data
US 2013/0126753 A1 May 23, 2013

(51) Int. Cl.
*G01T 1/20* (2006.01)
(52) U.S. Cl.
USPC ....................................... 250/361 R; 250/362
(58) Field of Classification Search
USPC .................... 250/361 R, 362, 370.09, 370.11
See application file for complete search history.

(56) References Cited

U.S. PATENT DOCUMENTS

| 4,758,488 A | 7/1988 | Johnson et al. |
| 2002/0131547 A1 | 9/2002 | Riedner et al. |
| 2008/0280037 A1 | 11/2008 | Sheridan et al. |

FOREIGN PATENT DOCUMENTS

| EP | 0 282 080 A2 | 9/1988 |
| WO | WO2010/058335 A2 | 5/2010 |

OTHER PUBLICATIONS

International Search Report for International Application No. PCT/US2012/062941 mailed Mar. 18, 2013, 3 pages.

*Primary Examiner* — Mark R Gaworecki

(57) ABSTRACT

Provided herein are scintillator screens comprising a substrate; a scintillation layer disposed over the substrate, the scintillation layer comprising a scintillator material; and an adhesive layer disposed by solvent coating over the scintillation layer, the adhesive layer comprising solvent-coatable thermally-sensitive elastomer, wherein the adhesive layer has a dust adhesion of ≤1 dust particles/sq.in.

20 Claims, 2 Drawing Sheets

1A         1B

X-RAY IMAGING PANEL WITH THERMALLY-SENSITIVE ADHESIVE AND METHODS OF MAKING THEREOF

FIELD OF THE INVENTION

The invention relates generally to X-ray imaging systems. More specifically, the invention relates to X-ray imaging panels having improved optical coupling between scintillator and light detector components, and methods for making the same.

BACKGROUND OF THE INVENTION

Digital radiography (DR) is increasingly accepted as an alternative to film-based imaging technologies that rely on photosensitive film layers to capture radiation exposure and thus to produce and store an image of a subject's internal physical features. With digital radiography, the radiation image exposures captured on radiation-sensitive layers in X-ray imaging panels are converted to electronic image data which is then stored in memory circuitry for subsequent readout and display on suitable electronic image display devices.

Generally, a scintillator (or scintillation) screen responds to incident X-ray radiation by generating visible light that is, in turn, detected by a photodetector having photosensors. The light information from the photodetector is subsequently transmitted to charge amplifiers. The outputs of the charge amplifiers are then typically applied to other circuitry that generates digitized image data that then can be stored and suitably image-processed as needed for subsequent storage and display. However, because scintillator materials respond to incident x-ray radiation by emitting light over a broad range of angles, there is some inherent amount of scattering in the detection process. This reduces the optical efficiency of image formation due to loss of light, signal crosstalk, and related effects, and tends to degrade image quality.

For example, a scintillator screen typically has a scintillation layer formed on a support that is highly transmissive to incident X-ray radiation. A protective overcoat layer may optionally be provided over the scintillation layer. Scintillator material in the scintillation layer responds to incident X-rays by emitting photons toward a photosensor, but over a broad range of angles, including angles at which the emitted light is effectively wasted due to total internal reflection (TIR) effects within the scintillation layer or, if provided, the overcoat layer. But so long as there is good optical coupling between the scintillator screen and the photodetector, a sufficient amount of the emitted signal is directed toward the photosensor.

In practice, there is often poor optical coupling between the scintillator screen and the photodetector. Air gaps or airborne contaminants, such as dust, can be trapped between the scintillator screen and the photodetector. For light at very small angles of incidence (relative to normal), the net effect of air gaps or airborne contaminants can be negligible. But for light at larger angles, air gaps or airborne contaminants can cause problems. When light is incident from a dense medium with a higher index of refraction, n, to a rare medium with a lower index of refraction, n', (e.g., n'=1.0 for air), TIR may occur at the interface of the two media depending on the angle of incidence. This means that some portion of light is lost, and another portion can be redirected to the wrong photodetector, i.e., crosstalk. The net effect includes lost efficiency and reduced spatial resolution, which is generally measured by the modulation transfer function (MTF). MTF is widely used in many imaging applications as a quantitative way of determining or measuring the resolution or sharpness of imaging devices. In digital radiography, MTF is dominantly decided by the scintillator screens used for X-ray absorption. Therefore, poor optical coupling due to the presence of air gaps or airborne contaminants at the interface of the scintillator screen and the photodetector can lead to increased TIR, reduced MTF, and result in poor image quality.

Conversely, improved optical coupling between the scintillator screen and the photodetector would help to boost efficiency and improve overall image quality accordingly. However, previously proposed solutions have shown only limited success, or may achieve improved optical coupling at the cost of increased complexity and higher expense, or may inadvertently introduce other problems. For example, while conventional pressure sensitive adhesives (PSAs), such as acrylic-based adhesives and laminates, have been used in the past to couple scintillator screens and photodetectors, PSAs are aggressively tacky at room temperature and strongly attract airborne contaminants such as dust. As such, when PSAs are used, extreme care must be taken to avoid trapping dust particles in the adhesive. For example, the scintillator screen should be stored and adhered to surfaces in a clean environment to minimize the introduction of contaminants.

Thus, while prior techniques may have achieved certain degrees of success in their particular applications, there is still room for improvement. Solutions that reduce or eliminate air gaps and/or airborne contaminants at the scintillator screen/photodetector interface without an elaborate number of steps and using materials appropriate for the scintillator or detector components would be particularly helpful.

SUMMARY OF THE INVENTION

In an aspect, there is provided a scintillator screen comprising a substrate; a scintillation layer disposed over the substrate, the scintillation layer comprising a scintillator material; and an adhesive layer disposed by solvent coating over the scintillation layer, the adhesive layer comprising solvent-coatable thermally-sensitive elastomer, wherein the adhesive layer has a dust adhesion of ≤1 dust particles/sq.in.

In another aspect, there is also disclosed a method of making a scintillator screen comprising solvent coating an adhesive solution on a scintillation screen comprising a scintillator material to form a coated surface, the adhesive solution comprising a solvent and a solvent-coatable thermally-sensitive elastomer; and drying the coated surface of the scintillation screen to create an adhesive layer.

In a further aspect, there is disclosed a method of making an X-ray imaging panel comprising solvent coating an adhesive solution on an X-ray imaging element to form a coated surface, wherein the X-ray imaging element comprises a scintillation screen coupled to a fiber optic glass plate, and wherein the adhesive solution comprises solvent-coatable thermally-sensitive elastomers; drying the coated surface of the X-ray imaging element to create an adhesive layer; contacting the adhesive layer on the X-ray imaging element with at least one photodetector; and laminating the X-ray imaging element to the at least one photodetector.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
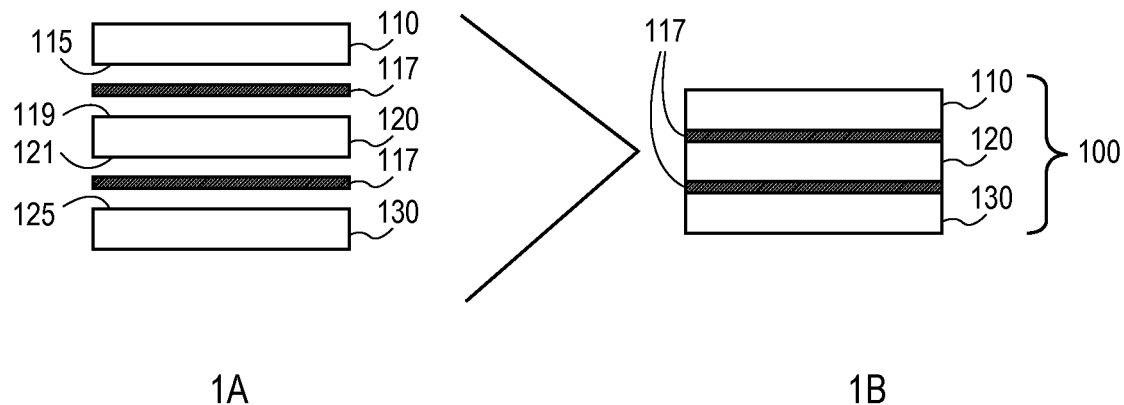
FIGS. 1A and 1B depict cross-sectional views of an X-ray imaging panel in accordance with various embodiments of the present disclosure.

The following is a detailed description of the preferred embodiments of the invention, reference being made to the drawings in which the same reference numerals identify the same elements of structure in each of the several figures.

As described earlier, conventional optical adhesives have been proposed and utilized for maintaining contact between the scintillator screen and the photodetector array in a number of X-ray imaging panel designs; however, such conventional optical adhesives have presented difficulties, e.g., trapping airborne contaminants. For example, when PSAs are used, extreme care must be taken to avoid trapping dust particles in the tacky adhesive surface at room temperature. Scintillator screens manufactured with PSAs should be stored and adhered to surfaces in a clean environment to minimize the introduction of contaminants. If contaminants are trapped in the scintillator screen prior to being adhered to a photodetector, TIR may occur at the interface of the scintillator screen and photodetector, resulting in crosstalk, reduced MTF, and poor image quality.

The present disclosure provides an X-ray imaging panel wherein the scintillator screen and photodetector components are optically coupled or bonded together using an optical adhesive comprising a thermally-sensitive elastomer, which allows the adhesive surface of the scintillator screen to be non-tacky at room temperature. Thus, compared to scintillator screens manufactured with conventional optical adhesives, the disclosed scintillator screen does not trap dust and other contaminants, and can be stored and adhered to surfaces without requiring a clean environment.

As shown in FIGS. 1A and 1B, the scintillator screen can be coupled to a fiber optic plate (FOP) to form a laminated X-ray imaging element. The X-ray imaging element can be further coupled to at least one photodetector. As shown in FIGS. 1A and 1B, the FOP 120 can have a first surface 119 and a second surface 121 opposite the first surface. The FOP 120 can be positioned between the scintillator screen 110 and the at least one photodetector 130. Typically, the light from a radiation image is transmitted from the scintillator screen to the photodetector through each fiber in the FOP. Thus, even though the scintillator screen is coupled to the FOP, the scintillation properties of its light-emitting surface are maintained. In an aspect, the light-emitting surface 115 of the scintillation screen 110 can be coupled to a first surface 119 of the FOP 120 (thereby maintaining its scintillation properties) and the light-receiving surface 125 of the photodetector 130 can be coupled to a second surface 121 opposite the first surface 119 of the FOP 120 in a sandwich-like fashion, as shown in FIG. 1B, to form an X-ray imaging panel 100. The scintillator screen 110, the FOP 120, and the photodetector 130 can each be independently coupled or bonded using an adhesive layer 117 comprising the disclosed optical adhesive including a thermally-sensitive elastomer.

The scintillator screen can include a substrate and a scintillation layer disposed thereover to form a light-emitting surface. Scintillator screens disclosed herein can take any convenient form provided they meet all of the usual requirements for use in digital radiography. In aspects, any flexible or rigid material suitable for use in scintillator screens can be used as a substrate to coat the scintillation dispersion, such as glass, plastic films, ceramics, polymeric materials, carbon substrates, and the like. In embodiments, the substrate can be made of ceramic (e.g., $Al_2O_3$,) or metallic (e.g., Al) or polymeric (e.g., PET) materials.

The scintillation layer can include a scintillator material. As used herein, "scintillator material" and "scintillation material" are used interchangeably and are understood to mean a material emitting photons upon exposure to electromagnetic radiation, as ordinarily understood by those skilled in the art, unless otherwise specified. For example, "scintillator material" can refer to inorganic materials capable of immediately emitting low-energy photons (e.g., optical photons) upon stimulation with and absorption of high-energy photons (e.g., X-rays).

Such materials that can be used in embodiments of the present disclosure include metal oxides, metal oxyhalides, metal oxysulfides, metal halides, and the like, and combinations thereof.

In embodiments, the scintillator material can be a metal oxide, for example, $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $RE_3Al5O_{12}$:Ce, and combinations thereof, wherein RE is at least one rare earth metal.

In another embodiment, the scintillator material can include one or more metal oxysulfides in addition to, or in place of, the metal oxides, such as $Gd_2O_2S$, $Gd_2O_2S$:Tb, $Gd_2O_2S$:Pr, and the like, and combinations thereof.

In other embodiments, the scintillator material can include a metal oxyhalide, such as LaOX:Tb, wherein X is Cl, Br, or I.

In further embodiments, the scintillator material can be a metal halide having a general formula of $M(X)_n$:Y, wherein M is at least one of La, Na, K, Rb, Cs; each X is independently F, Cl, Br, or I; Y is at least one of Tl, Tb, Na, Ce, Pr, and Eu; and n is an integer between 1 and 4, inclusive. Such metal halides can include, for example, $LaCl_3$:Ce and $LaBr_3$:Ce, among others. Other metal halide species that can be used in embodiments of the present disclosure include $RbGd_2F_7$:Ce, $CeF_3$, $BaF_2$, CsI(Na), $CaF_2$:Eu, LiI:Eu, CsI, CsF, CsI:Tl, NaI:Tl, and combinations thereof. Halide-like species, such as CdS:In, and ZnS can also be used in embodiments of the present disclosure.

In exemplary embodiments, the scintillator material is a metal oxysulfide, such as $Gd_2O_2S$.

The scintillator material can be present in the scintillation layer in an amount ranging from about 50% by volume to about 99% by volume, for example from about 70% by volume to about 90% by volume, relative to the total volume of the scintillation layer.

In aspects, the scintillation layer can include a scintillation material dispersed in a polymeric binder. The scintillator material can be dispersed in any polymeric binder known in the art for such purposes. Generally, the weight ratio of scintillation material to binder determines the light emission of the screen and the image-sharpness. The weight ratio of scintillation material to polymeric binder can range from about 1:1 to 100:1, for example from about 80:20 to 95:5.

In embodiments, the polymeric binder can include, but is not limited to, vinyl resins, polyesters, polyurethanes, and combinations thereof. For example, non-limiting useful binders include polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, polycarbonate, polyestercarbonates, and combinations thereof.

The thickness of the scintillation layer can range from about 10 μm to about 1000 μm, for example from about 50 μm to about 750 μm, such as from about 100 μm to about 500 μm.

Optionally, the scintillator screen can include a protective overcoat disposed over the scintillation layer and under the disclosed adhesive layer. The protective overcoat can comprise one or more polymer binders normally used for this purpose, such as cellulose ester (e.g., cellulose acetate) and other polymers that provide the desired mechanical strength and scratch and moisture resistance.

In aspects, the scintillation material can be mixed with a dissolved binder in a solvent to prepare a dispersion ("scintillation dispersion"). The dispersion can be uniformly applied to a substrate by any known coating technique, e.g. doctor blade coating, roll coating, gravure coating or wire bar coating, and dried to form a scintillation layer. In other aspects, the binder can be cured, for example by UV radiation, electron beam (EB), or can proceed chemically as known in the art.

Non-limiting examples of solvent-coatable thermally-sensitive elastomers that can be used in embodiments of the present disclosure include thermoset polymers, thermoplastic polymers, and combinations thereof.

Exemplary thermoset polymers include, but are not limited to, polyester, epoxies, urea/formaldehyde (e.g., Bakelite®), melamine, polyimides, cyanate esters, vulcanized rubber, and the like.

Exemplary thermoplastic polymers include, but are not limited to, acrylic (e.g., PMMA), polyethylene, polypropylene, cellulose acetate, polystyrene, polyurethane, and the like.

In an embodiment, the thermally-sensitive elastomer is a thermoplastic polyurethane. The thermally-sensitive elastomer can be mixed in a solvent to prepare a solution ("adhesive solution"). Any solvent can be used provided the thermally-sensitive elastomers are soluble therein. A non-limiting example is acetone but any suitable solvent can be used. The solution can be applied to a substrate by any known coating technique, e.g. doctor blade coating, roll coating, gravure coating or wire bar coating, and dried to form an adhesive layer. The thermally-sensitive elastomers can be present in the solution in an amount ranging from about 0.01% to about 50% by weight, for example from about 0.1% to about 10% by weight, such as from about 1% to about 5% by weight. The solvent-coatable thermally sensitive elastomers can be present in the adhesive layer in an amount ranging from about 10% to about 100%.

Photodetectors useful herein can have a light-receiving surface and can be configured to detect photons generated from the light-emitting surface of the scintillator screen. Non-limiting examples of at least one photodetector include photodiodes, photomultiplier tubes (PMT), CCD sensors (e.g., EMCCD), image intensifiers, and the like, and combinations thereof. Choice of a particular photodetector will depend, in part, on the type of scintillator screen being fabricated and the intended use of the ultimate device fabricated with the disclosed scintillator screen.

In aspects, the optical adhesive has an adhesive strength greater than about 8 lbf/in, for example greater than about 12 lbf/in. In other aspects, the FOP can have a thickness ranging from about 0.5 mm to about 5 mm, for example from about 1 mm to about 4 mm, such as from about 2 mm to about 3 mm.

Figure 2:
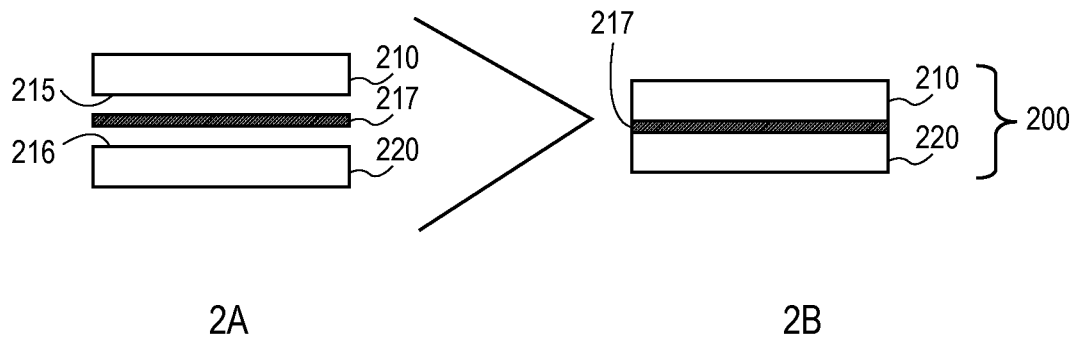
FIGS. 2A and 2B depict cross-sectional views of an X-ray imaging panel in accordance with various embodiments of the present disclosure.

As shown in FIGS. 2A and 2B, the scintillator screen 210 can be coupled directly to at least one photodetector 220 using the disclosed optical adhesive comprising a thermally-sensitive elastomer, without a FOP. The light-emitting surface 215 of the scintillation screen 210 can be directly coupled or bonded to the light-receiving surface 216 of the at least one photodetector 220 via an adhesive layer 217 comprising the disclosed optical adhesive to form an X-ray imaging panel 200.

In aspects, there is disclosed herein a method of making a scintillation screen, including applying an adhesive solution on a scintillation screen comprising a scintillator material to form a coated surface, the adhesive solution comprising a solvent and a thermally-sensitive elastomer; and drying the coated surface of the scintillation screen to create an adhesive layer. The method can further include contacting the adhesive layer on the scintillation screen with a fiber optic glass plate; and laminating the fiber optic glass plate and the scintillation screen to produce a laminated X-ray imaging element.

Any lamination technique known in the art suitable for preparing scintillation screens and X-ray imaging panels can be used herein without limitation. The scintillation screen can include a light-emitting surface. The light-emitting surface of the scintillation screen can be coupled to a first surface of the fiber optic glass plate. The fiber optic glass plate can further have a second surface opposite the first surface. The second surface can also be coated with the adhesive solution, and dried to form an adhesive layer on the fiber optic glass plate.

In aspects, there is disclosed herein a method of making an X-ray imaging panel, including applying an adhesive solution on an X-ray imaging element to form a coated surface, wherein the X-ray imaging element comprises a scintillation screen coupled to a fiber optic glass plate, and wherein the adhesive solution comprises thermally-sensitive elastomers; drying the coated surface of the X-ray imaging element to create an adhesive layer; contacting the adhesive layer on the X-ray imaging element with at least one photodetector; and laminating the X-ray imaging element to the at least one photodetector.

Any lamination technique known in the art suitable for preparing scintillation screens and X-ray imaging panels can be used herein without limitation. The fiber optic glass plate of the X-ray imaging element can be laminated to the light-receiving surface of the at least one photodetector.

Without being limited by theory, it is believed that because the disclosed optical adhesive is not tacky at room temperature, the adhesive has a low propensity to attract and trap airborne contaminates such as dust. In comparison, as discussed above, conventional adhesives like PSAs are aggressively tacky at room temperature and strongly attract and trap airborne contaminants. As such, a scintillator screen 110, 210 coated with the disclosed optical adhesive 117, 217 can be stored for a period of time and later coupled or bonded to a surface via lamination techniques without reduction in MTF or image quality. In other words, a scintillator screen coated with the disclosed adhesive 117, 217 can be stored for a period time without needing to be immediately bonded to a surface, and the resultant fabricated device with the scintillator screen still displays desirable image quality.

Without being limited by theory, it is believed that when heat and pressure from lamination techniques are applied to the disclosed optical adhesive 117, 217, the heat and pressure "activate" the thermally-sensitive elastomer to form a tacky adhesive surface for bonding. However, at room temperature, the adhesive surface 117, 217 is minimally tacky and has a low propensity for attracting airborne contaminants. Accordingly, because the disclosed optical adhesive repels far more airborne contaminates than conventional PSA adhesives at room temperature, X-ray imaging panels fabricated with the disclosed adhesive comprising thermally-sensitive elastomers will show reduced TIR (increased MTF) and therefore display improved image quality as compared to X-ray imaging panels manufactured with conventional PSA adhesives.

EXAMPLES

Comparative Example 1

A scintillator dispersion was prepared by first diluting 66.9 g of a 15% solution of Permuthane U-6366 binder from Stahl International in a mixture of a Methylene Chloride and Methanol (weight ratio of Methylene Chloride to Methanol in this dispersion was 12.7:1) with 34.7 g of the same solvent mixture of a Methylene Chloride and Methanol (The weight ratio of Methylene Chloride to Methanol in this dispersion was 12.7:1). Next, 300.0 g of terbium doped gadolinium oxysulfide, type 3010-55 from Nichia Corporation was added to the solution while mixing with a high speed mixer.

The scintillator dispersion prepared above was applied using a slot coating process to 7-mil thick polyethylene terephthalate (PET) films so as to achieve a dry scintillator coverage of approximately 40 g/ft² on each film. The PET support was pre-treated to improve adhesion of the scintillator coating. To improve coating uniformity, each PET film was cooled to a temperature of 15° C. during application of the scintillator dispersion. Once coated, each film was allowed to dry for 20 minutes while maintaining a film temperature of 15° C. The scintillator-coated films were then placed in a 70° C. oven for 5 minutes to remove residual solvent, forming scintillator screens.

Comparative Example 2

An acrylic adhesive coating solution was prepared by mixing 75 g of a polyacrylate PSA solution (Gelva GMS 788 from Cytec Industries) with 425 g of Ethyl Acetate. The acrylic adhesive solution was applied using a slot coating process over the scintillator screens from Comparative Example 1. The sample was laminated using a Differential Pressure Laminator onto a fiber optic glass plate (FOP) according to the conditions described below in Table 1.

TABLE 1

| Example | Lamination Temperature (° F.) | Vacuum Dwell (min) | Pressure Dwell (min) | Diaphragm Pressure (psi) |
|---|---|---|---|---|
| Comparative Example 2 | 310 | 1 | 8 | 15 |

Inventive Exmaple 1

A thermoplastic polyurethane (TPU) adhesive coating solution was prepared by dissolving 57.5 g of a predominantly linear hydroxyl polyurethane (Desmocoll 530/3 from Bayer Material Science) in 442.7 g of acetone. After preparation, the thermoplastic adhesive coating solution was filtered through a 6 micron filter to remove any insoluble contaminates, and applied using a slot coating process over the scintillator screens from Comparative Example 1. The sample was laminated using a Differential Pressure Laminator onto a fiber optic glass plate (FOP) according to the conditions described below in Table 2.

TABLE 2

| Example | Lamination Temperature (° F.) | Vacuum Dwell (min) | Pressure Dwell (min) | Diaphragm Pressure (psi) |
|---|---|---|---|---|
| Inventive Example 1 | 310 | 1 | 8 | 15 |

Adhesive Strength Measurement

Figure 3:
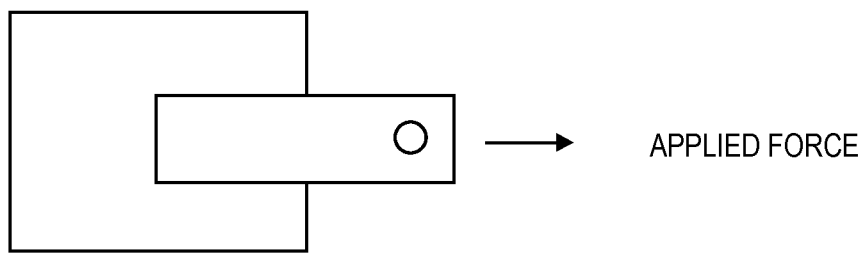
FIG. 3 depicts a method of testing adhesive bond strength.

The bond strength of the adhesives used to attach the scintillator screens was assessed by measuring the maximum sheer load required to de-laminate bonded screens. For each of the Comparative and Inventive Examples, a 0.5" by 2" scintillator screen was laminated to a FOP such that one half of the scintillator screen (0.5" by 1") was bonded to the FOP. The other half of the scintillator screen remained unbonded and extended beyond the edge of the FOP. A hole was punched in the unbonded end of each scintillator specimen so that a force gauge could be attached to the specimen, as shown in FIG. 3.

Laminated specimens where conditioned at 65° C. for 4 hours prior to testing. During testing, the laminated FOPs were held in a fixed position at 65° C. while a force gauge was used to apply a sheer load to the scintillator screen. Sheer force was applied to each scintillator screen at a rate of approximately 3-lbs per second.

Dust Assessment

To assess the adhesive coatings' propensity to trap airborne contaminates such as dust, 1 sq. in. samples of Comparative Example 2 and Inventive Example 1 were placed on a lab bench with the adhesive layers facing upward. The samples were left uncovered for 1 hour. The samples were then transferred to a Clean Hood. Compressed air was used to blow any free contaminate off the surface of the adhesive coatings. Samples were then examined under 7× magnification for the presence of trapped particle contaminate.

The results from the various tests are summarized in Table 3 below. MTF was measured using an Elitys Dental Generator using the following exposure conditions: 70 kV, 7 mA, 0.09 seconds.

TABLE 3

| Example | Dust Adhesion (# dust particles/ sq. in) | Line Pairs/mm @ MTF of 0.2 | Maximum Adhesive Sheer Strength (lbf/in) |
|---|---|---|---|
| Comparative Example 1 | 0 | 3.89 | 0 |
| Comparative Example 2 | 19 | 6.24 | 7.1 |
| Inventive Example 1 | 1 | 6.93 | >12 |

As seen in Table 3, Inventive Example 1 (thermally-sensitive adhesive) repelled dust nearly 20 times better than Comparative Example 2 (PSA adhesive). Furthermore, Inventive Example 1 bonded more strongly than Comparative Example 2. Inventive Example 1 also displayed the highest MTF value out of all tested specimens.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A scintillator screen comprising:
   a substrate;
   a scintillation layer disposed over the substrate, the scintillation layer comprising a scintillator material; and
   an adhesive layer disposed by solvent coating over the scintillation layer, the adhesive layer comprising solvent-coatable thermally-sensitive elastomers, wherein the adhesive layer has a dust adhesion of ≤1 dust particles/sq.in.

2. The scintillator screen of claim 1, wherein the thermally-sensitive elastomer is selected from the group consisting of thermoset polymers, thermoplastic polymers, and combinations thereof.

3. The scintillator screen of claim 2, wherein the solvent-coatable thermoset polymers are selected from the group consisting of polyesters, epoxies, urea/formaldehyde, melamine, cyanate esters, polyurethane, and combinations thereof.

4. The scintillator screen of claim 2, wherein the thermoplastic polymers are selected from the group consisting of acrylic, polyethylene, polypropylene, cellulose acetate, polystyrene, polyurethane, and combinations thereof.

5. The scintillator screen of claim 1, wherein the solvent-coatable thermally-sensitive elastomer is a thermoplastic polyurethane.

6. The scintillator screen of claim 1, wherein the adhesive layer has an adhesive strength greater than about 8 lbf/in.

7. The scintillator screen of claim 1, wherein the adhesive layer has an adhesive strength greater than about 12 lbf/in.

8. The scintillator screen of claim 1, wherein the solvent-coatable thermally-sensitive elastomer is present in the adhesive layer in an amount ranging from about 10% to about 100%.

9. The scintillator screen of claim 1, wherein the scintillator material comprises at least one phosphor selected from the group consisting of $Y_2SiO_5$:Ce; $Y_2Si_2O_7$:Ce; $LuAlO_3$:Ce; $Lu_2SiO_5$:Ce; $Gd_2SiO_5$:Ce; $YAlO_3$:Ce; ZnO:Ga; $CdWO_4$; $LuPO_4$:Ce; $PbWO_4$; $Bi_4Ge_3O_{12}$; $CaWO_4$; $GdO_2S$:Tb; $GdO_2S$:Pr; $RE_3Al5O_{12}$:Ce, and combinations thereof, wherein RE is at least one rare earth metal.

10. The scintillator screen of claim 1, wherein the scintillator material is present in the scintillation layer in an amount ranging from about 50% by volume to about 99% by volume, relative to the total volume of the scintillation layer.

11. The scintillator screen of claim 1, further comprising a fiber optic plate coupled to the scintillator screen by an adhesive layer comprising thermally-sensitive elastomers to form an X-ray imaging element.

12. A method of making a scintillator screen, comprising:
    solvent coating an adhesive solution on a scintillation screen comprising a scintillator material to form a coated surface, the adhesive solution comprising a solvent and a solvent-coatable thermally-sensitive elastomer; and
    drying the coated surface of the scintillation screen to create an adhesive layer.

13. The method of claim 12, further comprising:
    contacting the adhesive layer on the scintillation screen with a fiber optic glass plate; and
    laminating the fiber optic glass plate and the scintillation screen to produce a laminated X-ray imaging element.

14. The method of claim 12, wherein the thermally-sensitive elastomer is selected from the group consisting of thermoset polymers, thermoplastic polymers, and combinations thereof.

15. The method of claim 12, wherein the thermally-sensitive elastomer is a thermoplastic polyurethane.

16. The method of claim 12, wherein the thermally-sensitive elastomer is present in the adhesive solution in an amount ranging from about 0.1% to about 50%.

17. A method of making an X-ray imaging panel comprising:
    solvent coating an adhesive solution on an X-ray imaging element to form a coated surface, wherein the X-ray imaging element comprises a scintillation screen coupled to a fiber optic glass plate, and wherein the adhesive solution comprises thermally-sensitive elastomers;
    drying the coated surface of the X-ray imaging element to create an adhesive layer;
    contacting the adhesive layer on the X-ray imaging element with at least one photodetector; and
    laminating the X-ray imaging element to the at least one photodetector.

18. The method of claim 17, wherein the thermally-sensitive elastomer is selected from the group consisting of thermoset polymers, thermoplastic polymers, and combinations thereof.

19. The method of claim 17, wherein the thermally-sensitive elastomer is a thermoplastic polyurethane.

20. The method of claim 17, wherein the thermally-sensitive elastomer is present in the adhesive solution in an amount ranging from about 0.1% to about 50%.

* * * * *